United States Patent
Lima et al.

(10) Patent No.: US 11,585,237 B2
(45) Date of Patent: Feb. 21, 2023

(54) SYSTEM FOR THE AXIAL RETENTION OF A ROLLING ELEMENT BEARING

(71) Applicant: SAFRAN AIRCRAFT ENGINES, Paris (FR)

(72) Inventors: Christophe Lima, Moissy-Cramayel (FR); Boucif Bensalah, Moissy-Cramayel (FR); Alain Dominique Gendraud, Moissy-Cramayel (FR); Alberto Martin Matos, Moissy-Cramayel (FR); Valentin Olivier Jean-Jacques Quesnel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/275,133

(22) PCT Filed: Sep. 3, 2019

(86) PCT No.: PCT/FR2019/052025
§ 371 (c)(1),
(2) Date: Mar. 10, 2021

(87) PCT Pub. No.: WO2020/053504
PCT Pub. Date: Mar. 19, 2020

(65) Prior Publication Data
US 2022/0034237 A1 Feb. 3, 2022

(30) Foreign Application Priority Data
Sep. 13, 2018 (FR) ...................................... 1858242

(51) Int. Cl.
*F01D 25/16* (2006.01)
*F16C 27/04* (2006.01)
(Continued)

(52) U.S. Cl.
CPC ............ *F01D 25/164* (2013.01); *F16C 17/20* (2013.01); *F16C 27/045* (2013.01);
(Continued)

(58) Field of Classification Search
CPC ........ F16C 17/20; F16C 19/22; F16C 19/522; F16C 27/045; F16C 33/581; F16C 33/586;
(Continued)

(56) References Cited

U.S. PATENT DOCUMENTS 9,341,079 B2 * 5/2016 Antunes ................ F01D 25/164
9,708,931 B2 * 7/2017 Servant ................. F01D 21/045
2021/0062718 A1 * 3/2021 Bessy ....................... F02C 7/06

FOREIGN PATENT DOCUMENTS

FR      2960907 A1    12/2011
FR      3013760 A1    5/2015

OTHER PUBLICATIONS

International Search Report dated Nov. 14, 2019, issued in corresponding International Application No. PCT/FR2019/052025, filed Sep. 3, 2019, 5 pages.

(Continued)

*Primary Examiner* — James Pilkington
(74) *Attorney, Agent, or Firm* — Christensen O'Connor Johnson Kindness PLLC

(57) ABSTRACT

A system for the axial retention of a holding ring for a bearing for guiding in rotation a rotary shaft of a turbomachine is disclosed. The system includes an annular bearing support and a bearing holding ring that is borne by the annular bearing support. The bearing holder ring includes an upstream ring configured to be brought into contact with the bearing support and a downstream ring that is elastically deformable. The bearing support has a first axial retention element, and the bearing holding ring has a second axial (Continued)

retention element. The first and second axial retention elements are configured to cooperate with one another to axially retain the bearing holding ring in the event of damage to the downstream ring.

10 Claims, 5 Drawing Sheets

(51) Int. Cl.
    *F16C 33/58*     (2006.01)
    *F16C 35/077*     (2006.01)
    *F16C 17/20*     (2006.01)

(52) U.S. Cl.
    CPC .......... *F16C 33/581* (2013.01); *F16C 33/586* (2013.01); *F16C 35/077* (2013.01); *F16C 2360/23* (2013.01)

(58) Field of Classification Search
    CPC .. F16C 35/067; F16C 35/077; F16C 2360/23; F16C 2360/24; F01D 25/16; F01D 25/162; F01D 25/164; F05D 2240/50; F05D 2240/54
    See application file for complete search history.

(56) References Cited

OTHER PUBLICATIONS

Written Opinion of the International Searching Authority dated Nov. 14, 2019, issued in corresponding International Application No. PCT/FR2019/052025, filed Sep. 3, 2019, 6 pages.
Written Opinion dated Nov. 14, 2019, issued in corresponding International Application No. PCT/FR2019/052025, filed Sep. 3, 2019, 6 pages.
International Preliminary Report on Patentability dated Mar. 9, 2021, issued in corresponding International Application No. PCT/FR2019/052025, filed Sep. 3, 2019, 7 pages.

* cited by examiner

SYSTEM FOR THE AXIAL RETENTION OF A ROLLING ELEMENT BEARING

FIELD OF INVENTION

The present invention relates to the field of bearings for guiding in rotation a rotary shaft and in particular to supports of bearings for guiding a turbomachine shaft. In particular, it concerns a system for the axial retention of a rolling ring of this guiding bearing and a turbomachine equipped with such a system.

BACKGROUND

The turbomachines generally comprise one or more guiding bearings for guiding a rotary shaft of a turbomachine relative to a fixed part, such as a fixed casing of the turbomachine. These guiding bearings comprise an inner ring and an outer ring forming rolling tracks and enclosing rolling elements such as rollers or balls. Typically, the outer ring is securely mounted on the fixed part of the turbomachine and the inner ring is securely mounted on the rotary shaft of the turbomachine.

Typically, this type of guiding bearing is a bearing or a roller or ball rolling. This bearing is carried by an annular bearing support which is fixed to a fixed casing of the turbomachine and has a certain flexibility so that it can deform when the turbomachine is started up and thus allow a certain offset of the bearing in the event of unbalance. This offset allows the bearing to absorb radial loads.

The roller bearing is supported by an annular support which is attached to the fixed casing of the turbomachine and which is also flexible enough to avoid dynamic problems. In a classic and well-known manner, this bearing also comprises an annular holding ring with a rigid upstream part forming a rolling track and a flexible downstream part allowing the necessary deformations to take up the radial loads. This holding ring forms the outer ring of the bearing. In addition, the roller bearing conventionally comprises a rigid rolling annulus arranged radially between the annular bearing support and the bearing holding ring. This rolling annulus, which is fixed to the bearing support, maintains a film of damping oil on the outer surface of the upstream part of the bearing holding ring. This fluid damping film is known as a squeeze film and helps to dampen some of the vibrations of the turbomachine during operation. There is a clearance between the bearing holding ring and the rolling annulus.

Under high radial loads, the consumption of the clearance between the rolling annulus and the bearing holding ring can lead to creep. This creep occurs, for example, when, in the event of an engine failure (e.g. due to a loss of fan blade due to a bird strike), the upstream part of the bearing holding ring moves radially within the rolling annulus and comes into contact with the inner surface of the latter, causing an unbalance on the downstream part of the ring. The unbalance generates a torque as it rotates. When the torque becomes too high, the downstream part of the holding ring breaks. If the downstream part of the holding ring breaks, the rigid part forming the rolling track of the ring can move axially downstream until the support function of the rotary shaft is lost. Means of retaining the downstream part of the holding ring have been developed in the past, as for example illustrated in the document FR 3 013 760 A1.

PURPOSE OF THE INVENTION

We propose to find a technical solution to ensure the function of the holding ring even under the most extreme conditions, e.g. if a fan blade is lost.

SUMMARY OF THE INVENTION

This purpose is achieved in accordance with the invention by means of a system for the axial retention of a holding ring of a bearing for guiding in rotation a rotary shaft of a turbomachine extending along a longitudinal axis, the retention system comprising an annular bearing support intended to be secured to a fixed part of the turbomachine, and a bearing holding ring carried by the annular bearing support, the bearing holding ring extending along the longitudinal axis X and comprising an upstream part, called the upstream ring, intended to be brought into contact with the bearing support and a downstream part, called the downstream ring, that is elastically deformable and intended to be connected to the fixed part. The system is characterised in that the bearing support comprises a first axial retention element and the bearing holding ring comprises a second axial retention element, and in that this first and second axial retention elements are configured to cooperate with each other so as to axially retain the bearing holding ring in the event of damage to the downstream ring.

Thus, this solution achieves the above-mentioned objective. Especially in the event of damage to the downstream ring, e.g. if the downstream ring is axially compressed, the upstream ring is prevented from slipping downstream and is nevertheless held in an axial position that allows the guiding bearing to operate.

The system according to the invention may comprise one or more of the following characteristics, taken in isolation from each other or in combination with each other:
- the first and second axial retention elements are integral with the bearing support and the holding ring respectively,
- the first and second axial retention elements each have at least one annular tooth extending along a radial axis substantially perpendicular to the longitudinal axis so as to be able to cooperate with each other axially and to form a snap connection,
- each of the annular teeth of the first retention element extends radially towards the outside of the turbomachine and each of the annular teeth of the second retention element extends radially towards the inside of the turbomachine,
- the at least one first axial retention element of the annular bearing support is arranged downstream of the at least one second axial retention element of the bearing holding ring,
- each axial retention element of the bearing support and the bearing holding ring extends circumferentially in a plane substantially perpendicular to the longitudinal axis and has two circumferential ends, the circumferential ends of each first axial retention element of the bearing support also comprising each a chamfer on their upstream faces,
- the circumferential ends of each annular tooth of the bearing holding ring, in addition, on their downstream faces, each comprise a chamfer so as to cooperate with each of the chamfers of each of the first axial retention elements of the bearing support, at least one of the axial retention elements has a different circumferential length from the circumferential length of the other axial retention elements, the system further comprises a rolling annulus, arranged radially between the annular bearing support and the bearing holding ring, the rolling annulus comprising at least one annular tooth which is extending radially so as to be able to cooperate axially with the at least one second axial retention element of the bearing holding ring to form a snap connection, the at least one second axial retention element of the bearing holding ring is arranged axially between the at least one first axial retention element of the annular bearing support and the at least one second axial retention element of the rolling annulus, the downstream ring comprises two axial ends between which longitudinal small columns extend, so as to allow ovalization of said downstream ring, the guiding bearing comprises a fluid damping film trapped in a damping chamber, the damping chamber being radially delimited between the holding ring and the rolling annulus integral with the bearing support.

The invention also relates to an aircraft turbomachine comprising a system for the axial retention of a bearing rolling ring as described above.

BRIEF DESCRIPTION OF THE FIGURES

The invention will be better understood, and other purposes, details, characteristics and advantages of the invention will become clearer on reading the following detailed explanatory description of the embodiments of the invention given as purely illustrative and non-exhaustive examples, with reference to the annexed schematic drawings in which.

DESCRIPTION OF EMBODIMENTS OF THE INVENTION

Figure 1:
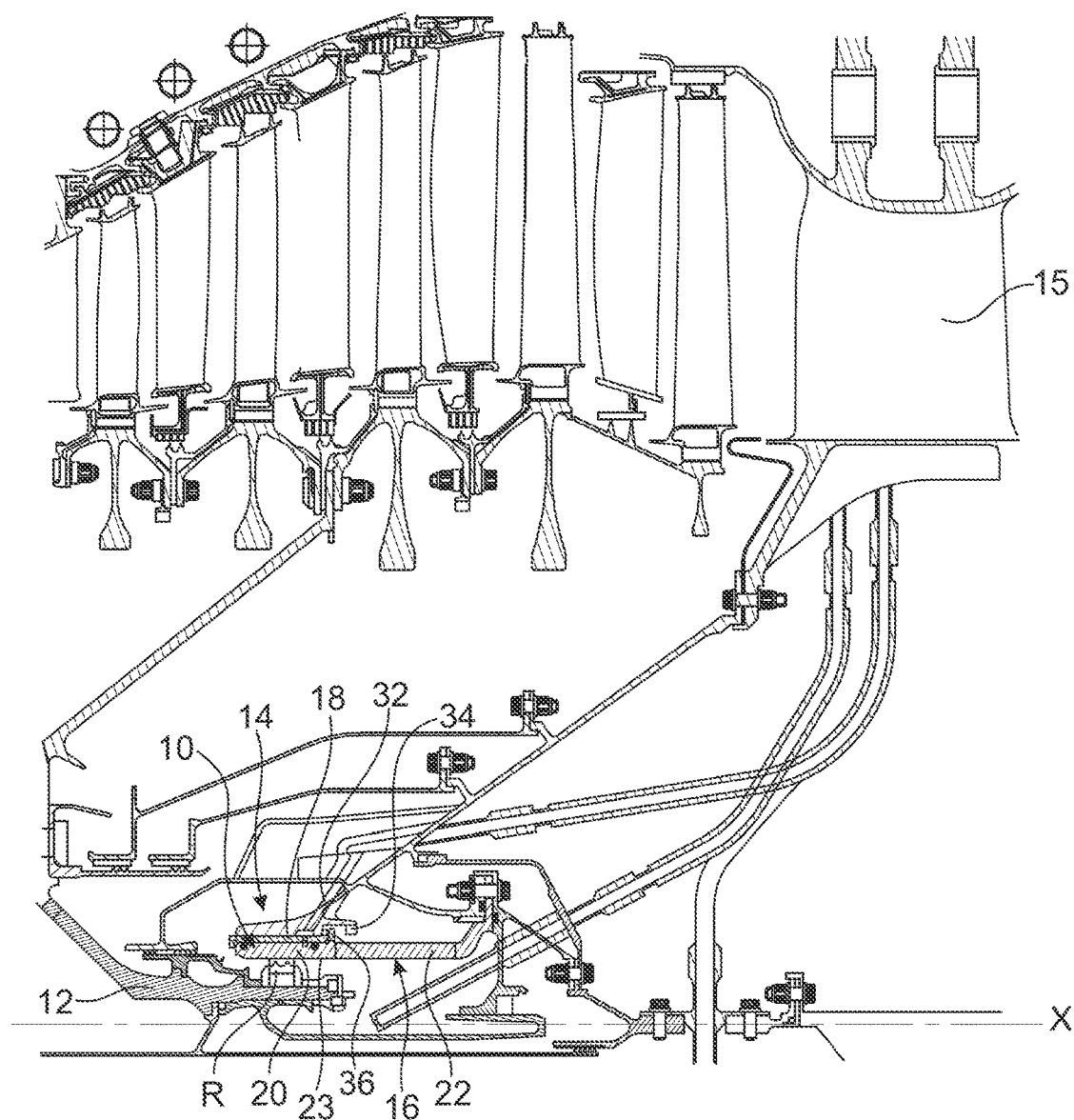
FIG. 1 illustrates a schematic longitudinal section of a bearing for guiding in rotation a turbomachine shaft comprising a system for the axial retention according to the invention.

The FIG. 1 shows the considered environment of the present invention, a bearing 10 for guiding in rotation a rotary shaft 12 of a turbomachine. This rotary shaft 12 is, for example, a high-pressure compressor shaft of a turbomachine. The rotary shaft 12 can of course be any shaft which is driven in rotation by means of a guiding bearing in the turbomachine. The turbomachine conventionally extends along a longitudinal axis of rotation X parallel to the direction of gas flow. In the following, the terms "downstream" and "upstream" are used in reference to this axis X and the direction of gas flow.

The rotational guiding bearing 10 is supported by a relatively flexible annular bearing support 14 which is mounted around the shaft 12. The annular bearing support 14 is substantially cylindrical in shape and comprises a first annular flange at its downstream end for connection to a fixed part 15 of the turbomachine.

Figure 2:
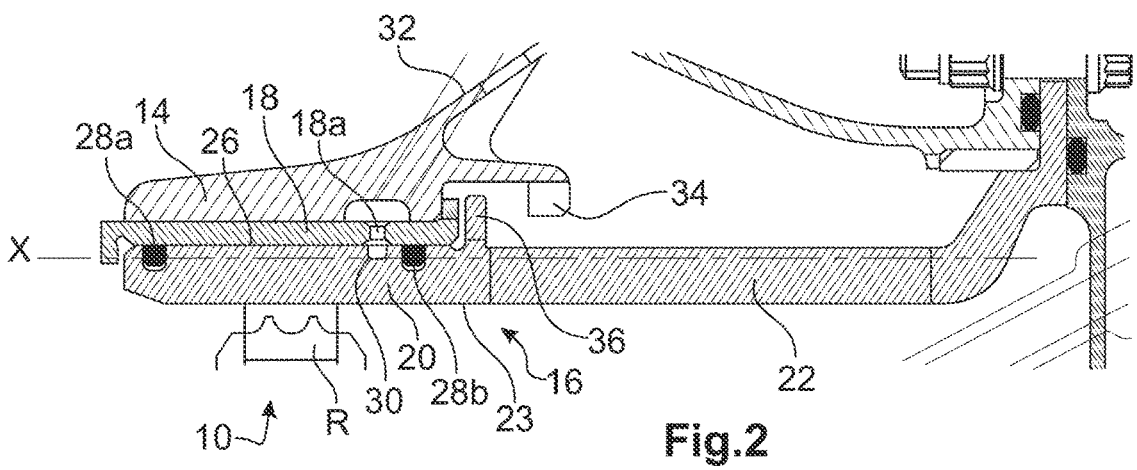
FIG. 2 is an enlargement of the schematic section of the FIG. 1.

As shown in the FIG. 2, the rotational guiding bearing 10 also has:

a bearing holding ring 16 carried by said annular bearing support 14, radially arranged between the annular bearing support 14 and the shaft 12, a rolling annulus 18, arranged radially between the annular bearing support 14 and the bearing holding ring 16.

Figure 3:
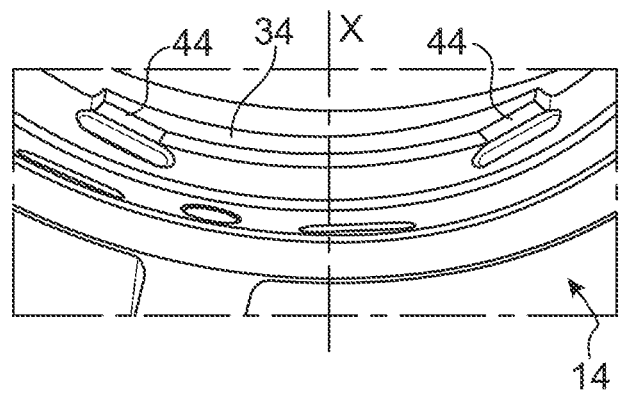
FIG. 3 is a perspective view of a bearing holding ring according to the present invention.

As can be seen in FIGS. 2 and 3, this bearing holding ring 16 extends along the longitudinal axis X. The bearing holding ring 16 is in two parts. In this example, both parts are integral. The bearing holding ring 16 comprises of a first part, called the upstream ring 20, which is intended to be brought into contact with the annular bearing support 14 and a second part, called the downstream ring 22, which is elastically deformable and is intended to be connected to the fixed part 15 of the turbomachine.

The downstream ring 22 has two axial ends and the downstream ring 22 is fixed to the fixed part 15 of the turbomachine by its downstream end. This downstream end of the downstream ring 22 is secured to the fixed part 15 of the turbomachine by means of a second annular connecting flange to which the said downstream end of the downstream ring can, for example, be bolted.

The upstream ring 20 forms an annular outer ring of the guiding bearing 10. The latter also comprises an annular inner ring (not shown) which is mounted on the rotary shaft 12 (high pressure shaft). The inner ring is shrunk onto the shaft 12 in such a way that it cannot move or rotate. Rolling elements are arranged between the outer ring part and the inner ring. These rolling elements may comprise rollers or balls. The upstream ring 20 is intended to be brought into contact with at least one rolling element of the bearing 10, in this case a set of rollers R. The upstream ring 20 comprises an outer face which therefore forms rolling tracks 23 of the bearing 10. The inner ring also comprises an inner face forming rolling tracks.

More specifically, the upstream ring 20 has a continuous profile substantially O-shaped with an axis of revolution X, whereas the downstream ring 22 has a substantially I-shaped profile, with an upstream neck and a downstream neck at each of its axial ends. At least one aperture can be provided in the downstream neck so that the downstream end of the downstream ring 22 can be secured to the second annular flange for connection to the fixed part 15 of the turbomachine by means of bolts or screws, for example.

In order to allow the downstream ring 22 to deform, several axial apertures are provided in it so as to define between them longitudinal small columns 24 evenly distributed around the longitudinal axis X of the turbomachine. These small columns 24 are elastically deformable in an axial and/or radial direction and thus allow ovalisation of the downstream ring 22. When the turbomachine is in operation, this downstream ring 22 deforms, allowing the bearing 10 to be offset, for example due to unbalance. This allows the radial loads caused by said unbalance to be taken up in a known manner.

In particular, the rolling annulus 18 is arranged around the upstream ring 20 of the bearing holding ring 16. This rolling annulus 18 is rigid and acts as a compression damper by allowing an oil film (not shown) to be arranged at the interface 26 of the bearing holding ring 16 and the annular bearing support 14. This oil film extends to the outer surface of the bearing holding ring 16 and thus absorbs a part of the vibrations experienced by the bearing holding ring 16 and limits its transmission to the annular bearing support 14. The damping oil film is provided in an annular damping chamber. This is located radially between the rolling annulus 18 and the upstream ring 20. The damping chamber is bounded radially by the outer surface of the upstream ring 20 and the inner surface of the rolling annulus 18 and axially by two annular seals 28a, 28b. The seals 28a, 28b are advantageously, but not restrictively, positioned in annular grooves in the upstream ring 20. The grooves are located near its upstream and downstream axial ends, as shown in the FIG. 2. The upstream and downstream ends are axially opposite. Between the two seals 28a, 28b, the outer surface of the upstream ring 20 has an oil distribution groove 30 which is fed by a conduit 32. This oil distribution groove 30 is located approximately in line with the outer surface of the upstream ring 20 and allows uniform distribution of the oil all over said outer surface and the formation of an oil film of uniform thickness. In particular, the rolling annulus 18 comprises a hole 18a (see FIG. 2) which passes through the wall of the rolling annulus 18 on both sides along the radial axis. The hole 18a opens into the distribution groove 30. Similarly, the conduit 32 opens into the hole 18a of the rolling annulus 18.

As mentioned above, when the deformation of the downstream ring 22 exceeds a certain threshold, one or more of the small columns 24 may break, leading to a downstream axial movement of the bearing holding ring 16 and preventing the proper functioning of the turbomachine.

As can be seen in FIG. 2, the system according to the present invention comprises elements for the axial retention of the bearing holding ring 16 on the annular bearing support 14 in the event of one or more of the small columns 24 of the downstream ring 22 breaking. The annular bearing support 14 comprises at least one first axial retention element 34 and the bearing holding ring 16 comprises at least one second axial retention element 36. These first and second elements 34, 36 are configured to cooperate with each other to axially retain the bearing holding ring 16 in the event of damage to the downstream ring 22. These first and second axial retention elements are integral with the bearing support and the holding ring 16 respectively.

Damage means, for example, the breaking or deformation of one or more small columns 24 as described above. After a certain number of broken or deformed small columns 24, the downstream ring 22 is no longer functional and can no longer be used to connect the upstream ring 20 to the fixed part 15 of the turbomachine in a satisfactory manner.

Figure 4:
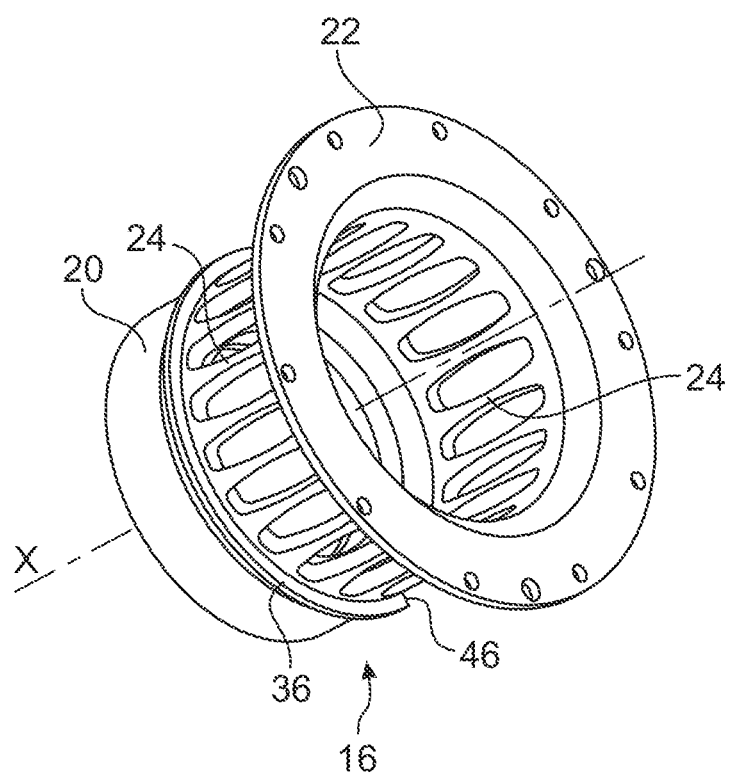
FIG. 4 is an internal view of a part of a bearing support according to the present invention.

According to the embodiment presented here, the axial retention elements 34, 36 are each in the form of at least one annular tooth 34, 36. In particular, a first annular tooth 34 is carried by a downstream end of the bearing support 14. We understand that each annular tooth is integral with the bearing support 14. The first annular tooth 34 protrudes, substantially perpendicular to the axis X, from an inner surface of the bearing support 14 towards the interior of the turbomachine, as shown in FIG. 4. A second annular tooth 36 is carried by a downstream end of the upstream ring 20. Similarly, the second annular tooth 36 protrudes, substantially perpendicular to the axis X, from the outer surface of the upstream ring 20 towards the outside of the turbomachine, as shown in FIGS. 2 and 3. Similarly, we understand that each annular tooth is integral with the upstream ring. In particular, it can be seen from FIG. 5 that in this case the bearing holding ring 16 and the annular bearing support 14 each comprises three annular teeth 34, 36 evenly distributed around the longitudinal axis X. The annular teeth 34 of the bearing support 14 and the annular teeth 36 of the bearing holding ring 16 can therefore cooperate axially with each other (a first annular tooth 34 with a second annular tooth 36 respectively) to form a snap connection. Such a configuration prevents downstream slipping of the upstream ring 20 in the event of damage to the downstream ring 22, as defined above and as will be seen below.

Figure 6:
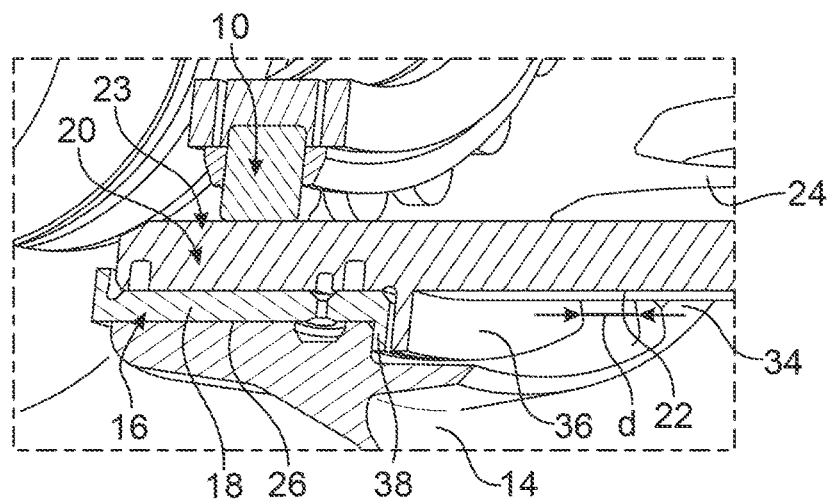
FIG. 6 is a longitudinal section of the system for the axial retention in the configuration shown in the FIG. 5.

As shown in FIG. 6, the rolling annulus 18 also comprises at least one annular tooth 38. This annular tooth 38 is, for example, continuous around the entire circumference of the rolling annulus 18. It protrudes radially from the downstream end of the rolling annulus 18 towards the outside of the turbomachine. This annular tooth 38 thus makes it possible, on the one hand, to axially lock the bearing support 14 (see FIG. 2) and, on the other hand, to cooperate axially with the set of teeth 36 of the bearing holding ring 16 to form a snap connection. In addition, the annular tooth 38 serves as an upstream support for the set of annular teeth 36 of the bearing holding ring 16 when the latter is undamaged and is in the functional position. Thus, the set of annular teeth 36 of the bearing holding ring 16 is arranged axially between the set of teeth 34 of the annular bearing support 14 and the annular tooth 38 of the rolling annulus 18.

In normal operation of the turbomachine, the first annular teeth 34 of the bearing support 14 are each arranged at a distance d (see FIG. 6) downstream of the second annular teeth 36 of the bearing holding ring 16. The distance d defines the functional distance which ensures the correct positioning of the upstream ring 20 and thus the rolling tracks 23 in relation to the roller set R of the bearing 10. It will be explained below how, in the event of damage to the downstream ring 22, the distance d is maintained between the sets of annular teeth 34, 36.

Figure 5:
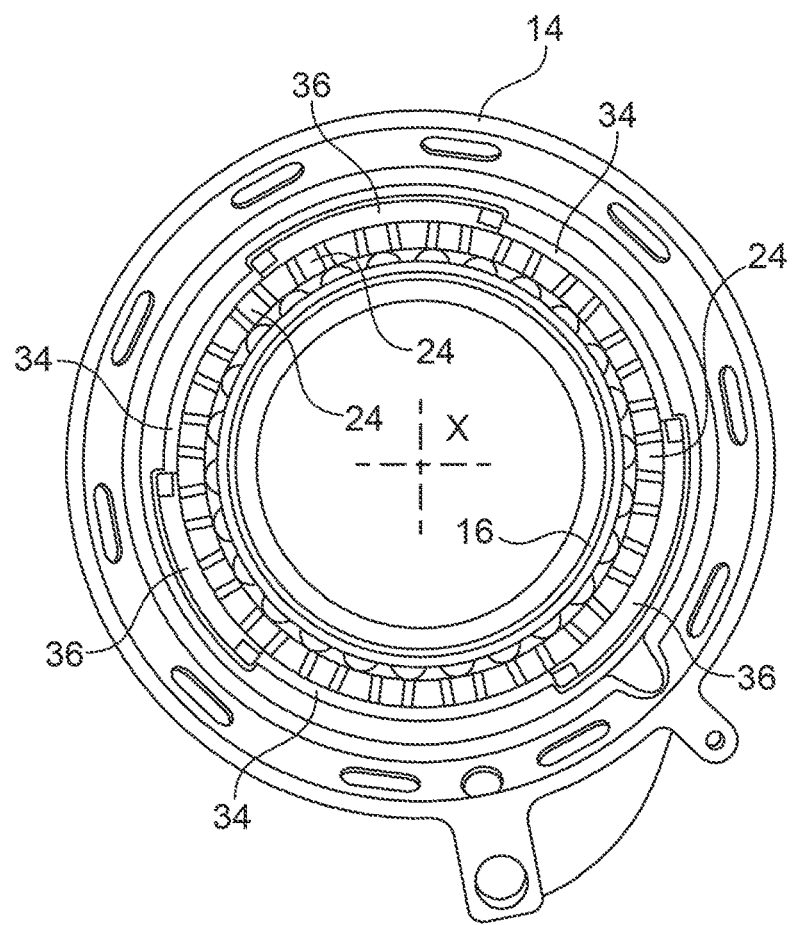
FIG. 5 is a downstream view of the system for the axial retention according to the invention in a through angular configuration.

As can be seen, for example, in FIG. 5, each of the annular teeth 34, 36 of the system for the axial retention as described here extends circumferentially in a plane approximately perpendicular to the longitudinal axis X and thus comprises two opposite circumferential ends. The annular teeth 34, 36 do not all have the same circumferential length. At least one of the annular teeth 34, 36 may have a circumferential length which is different from the circumferential length of the other annular teeth 34, 36. In particular, each of the teeth 34, 36 has its own circumferential length which significantly reduces the possibility of losing the centring function of the bearing 10: a single angular position of the upstream ring 20 relative to the bearing support 14 allows the upstream ring 20 to pass axially through the downstream toothed profile of the bearing support 14 and prevents a return to a distance d between the teeth 34, 36.

Each of these circumferential ends of each of the annular teeth 34, 36 of the claimed system comprises a chamfer 44, 46, as shown in FIGS. 3 and 4. Specifically, the circumferential ends of each of the teeth 34 of the bearing support 14 have a chamfer 44 on an upstream face and each of the circumferential ends of each of the teeth 36 of the bearing holding ring 16 have a chamfer 46 on a downstream face. Each chamfer 44 of the circumferential ends of the annular teeth 34 of the bearing support 14 is therefore positioned opposite a chamfer 46 of a circumferential end of the annular teeth 36 of the bearing holding ring 16.

If the turbomachine is in operation and the downstream ring 22 is damaged, for example for one of the reasons mentioned above, the latter can either be subjected to axial compression, causing the upstream ring 20 to slide downstream of the turbomachine, or, if a very large number of small columns 24 are damaged, it can become detached from the upstream ring 20, which can then also be driven downstream of the turbomachine. If the displacement of the upstream ring 20 is greater than the distance d, the supporting function of the shaft 12 is lost and the bearing 10 no longer functions.

Figure 7A:
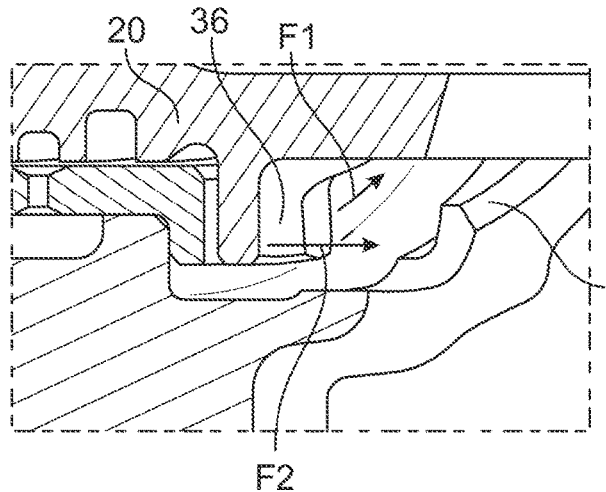
FIG. 7 is a succession of longitudinal sections of the system for the axial retention according to the present invention in a non-passing configuration.
Figure 7B:
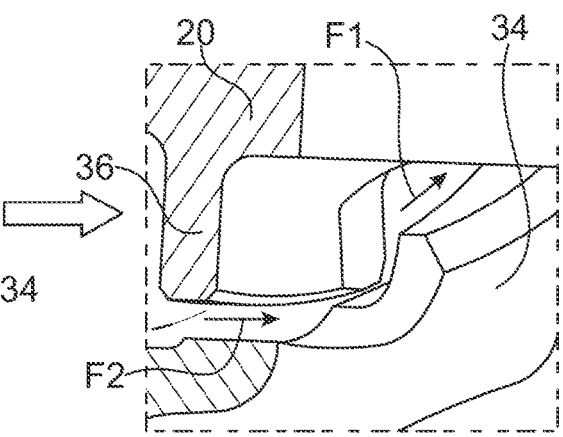
Figure 7C:
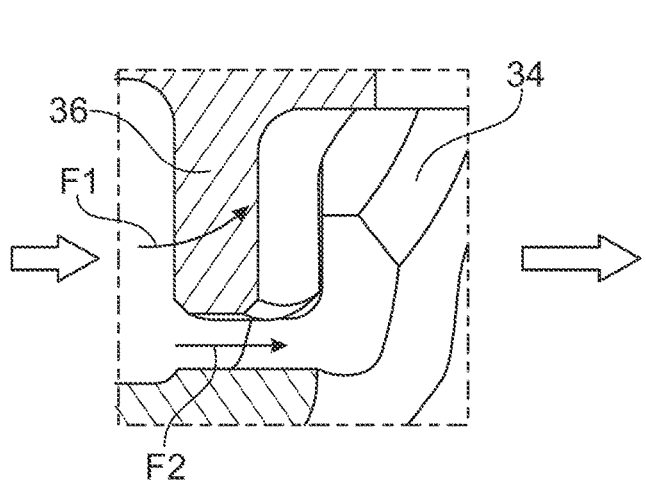
Figure 7D:
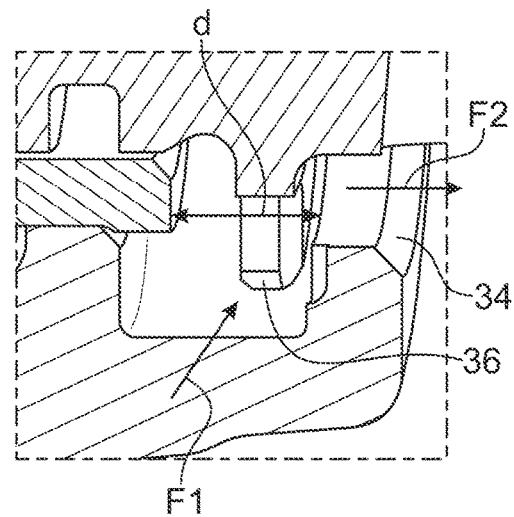
Figure 8:
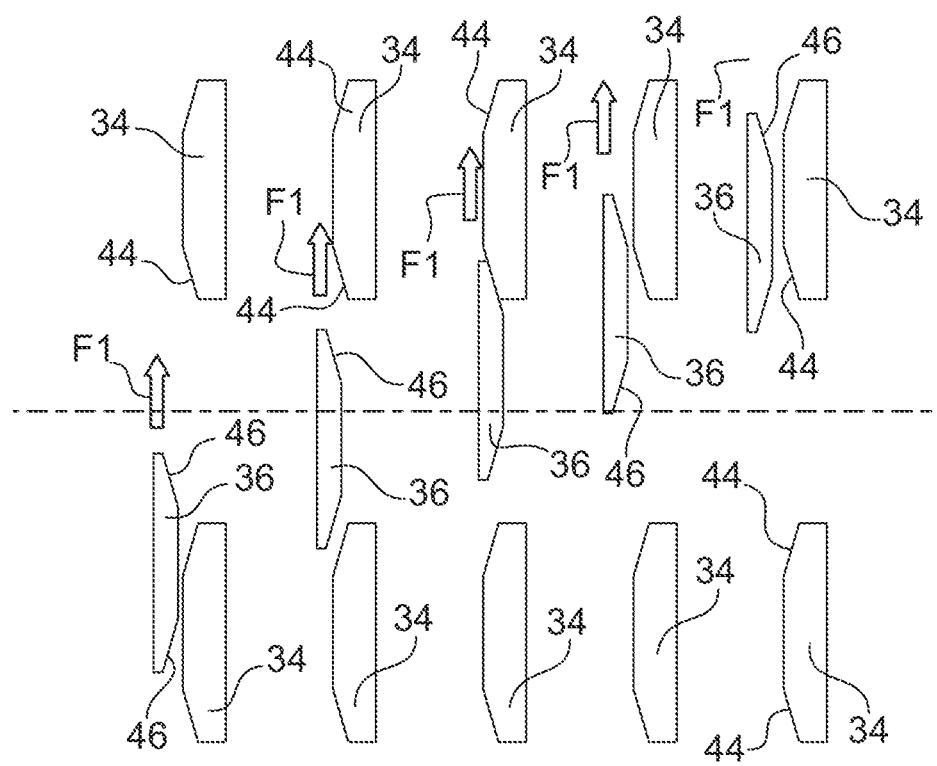
FIG. 8 is a schematic view of the operation of this system for the axial retention.

When the upstream ring 20 is disengaged from the downstream ring 22 due to a breakage of the small columns 24, the upstream ring 20 is then rotated F1 around the roller assembly R of the bearing 10, as shown in FIG. 7a. In parallel with this rotary movement F1, the upstream ring 20 undergoes an axial movement F2 driving it downstream of the turbomachine. This axial movement F2 is limited to the distance d by the set of annular teeth 34, 36. Indeed, when the upstream ring 20 has moved the distance d, the set of annular teeth 36 of the bearing ring 16 comes into contact with the set of annular teeth 34 of the bearing support 14 and the downstream movement F2 of the upstream ring 20 is thus blocked. On the one hand, the chamfer-chamfer contact 44, 46 limits the impact when the annular teeth 36 collide with the annular teeth 34 and, on the other hand, the chamfer-chamfer contact 44, 46 induces an axial backward movement of the upstream ring 20, which keeps the upstream ring 20 in its functional position and prevents further damage, as can be seen in FIG. 8.

As mentioned above, the fact that each annular tooth 34, 36 has a different length greatly reduces the probability that the upstream ring 20 can pass through the downstream toothed profile of the bearing support 14 and move a distance greater than the distance d.

The invention claimed is:

1. A system for the axial retention of a holding ring for a bearing for guiding in rotation a rotary shaft of a turbomachine extending along a longitudinal axis, the retention system comprising:
    an annular bearing support configured to be secured to a fixed part of the turbomachine, and
    a bearing holding ring carried by the annular bearing support, the bearing holding ring extending along the longitudinal axis and comprising an upstream ring located within the bearing support and a downstream ring that is elastically deformable and intended to be connected to the fixed part,
    wherein the bearing support comprises a first axial retention element, and the bearing holding ring comprises a second axial retention element, the first and second axial retention elements being configured to cooperate with each other to axially retain the bearing holding ring when the downstream ring is damaged, wherein the first and second axial retention elements each has at least two annular teeth extending along a radial axis perpendicular to the longitudinal axis.

2. The system for the axial retention according to claim 1, wherein each of the annular teeth of the first retention element extends radially towards the inside of the turbomachine, and each of the annular teeth of the second retention element extends radially towards the outside of the turbomachine.

3. The system for the axial retention according to claim 1, wherein the first axial retention element of the annular bearing support is arranged downstream of the at least one second axial retention element of the bearing holding ring.

4. The system for the axial retention according to claim 1, wherein the system further comprises a rolling annulus arranged radially between the annular bearing support and the bearing holding ring, the rolling annulus comprising at least one annular tooth extending radially.

5. The system for the axial retention according to claim 4, wherein the second axial retention element of the bearing holding ring is arranged axially between the first axial retention element of the annular bearing support and the at least one annular tooth of the rolling annulus.

6. The system for the axial retention according to claim 1, wherein each of the first and second axial retention elements extends circumferentially in a plane perpendicular to the longitudinal axis and comprises two circumferential ends.

7. An aircraft turbomachine comprising a system for the axial retention of a bearing rolling ring, according to claim 1.

8. A system for the axial retention of a holding ring for a bearing for guiding in rotation a rotary shaft of a turbomachine extending along a longitudinal axis, the retention system comprising:
    an annular bearing support configured to be secured to a fixed part of the turbomachine, and
    a bearing holding ring carried by the annular bearing support, the bearing holding ring extending along the longitudinal axis and comprising an upstream ring located within the bearing support and a downstream ring that is elastically deformable and intended to be connected to the fixed part,
    wherein the bearing support comprises a first axial retention element, and the bearing holding ring comprises a second axial retention element, the first and second axial retention elements being configured to cooperate with each other to axially retain the bearing holding ring when the downstream ring is damaged, wherein the first and second axial retention elements each has at least two annular teeth extending along a radial axis perpendicular to the longitudinal axis, and wherein the axial retention elements of the bearing support and of the bearing holding ring extend circumferentially in a plane perpendicular to the longitudinal axis and comprise two circumferential ends, each circumferential end of the first axial retention element of the bearing support also comprising a chamfer on a respective upstream face.

9. The system for the axial retention claim 8, wherein each circumferential end of each second axial retention element of the bearing holding ring further comprises, on a respective downstream face, a chamfer to cooperate with each of the chamfers of each of the first axial retention elements of the bearing support.

10. The system for the axial retention according to claim 8, wherein at least one of the axial retention elements has a circumferential length different from a circumferential length of the other axial retention elements.

* * * * *